Oct. 5, 1948.  S. W. SEELEY  2,450,616
ELECTRICAL NETWORKS FOR PHASE SHIFTERS
Filed Aug. 5, 1944
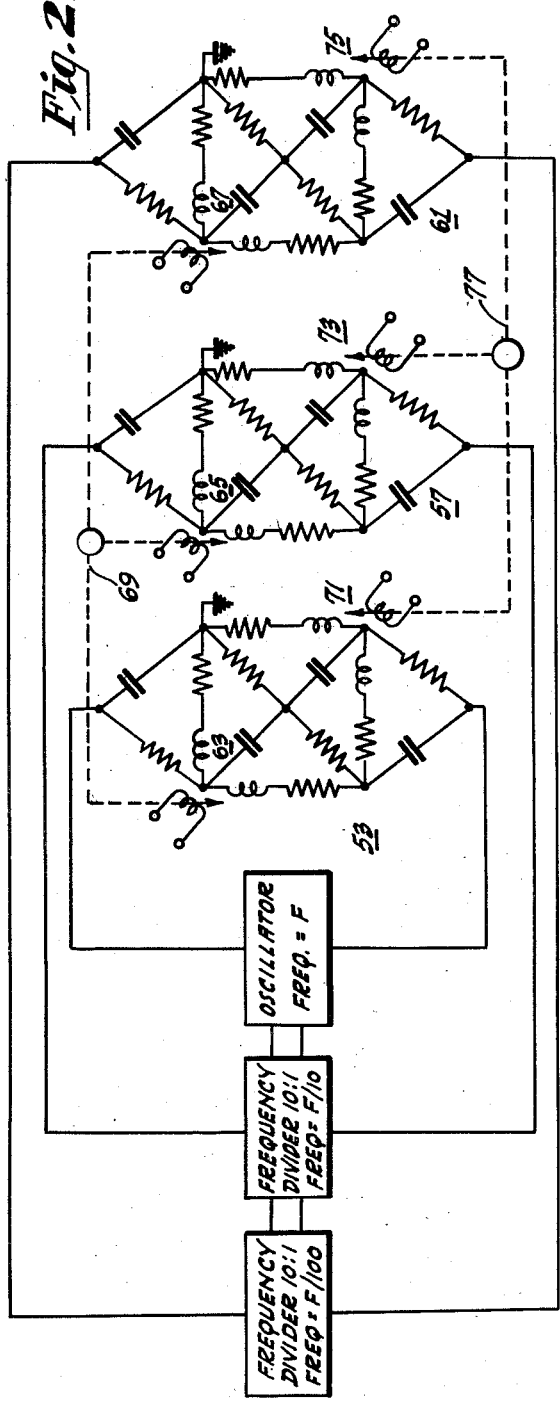
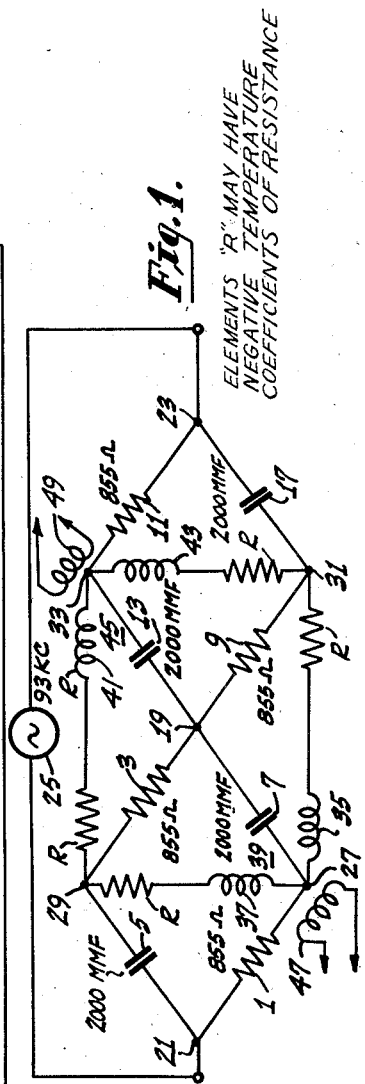
INVENTOR.
STUART W. SEELEY
BY
ATTORNEY Patented Oct. 5, 1948

2,450,616

UNITED STATES PATENT OFFICE 2,450,616

ELECTRICAL NETWORKS FOR PHASE SHIFTERS

Stuart W. Seeley, Roslyn Heights, N. Y., assignor to Radio Corporation of America, a corporation of Delaware Application August 5, 1944, Serial No. 548,183

8 Claims. (Cl. 172—238)

1

This invention relates to electrical networks for phase shifting and more particularly to an electrical network for obtaining quadrature phase potentials from a single phase source.

In numerous applications of radio and electrical currents, it is desirable to obtain quadrature phase currents from a single phase source. It is also desirable to provide convenient means for shifting continuously the phase of an alternating voltage. In some applications of radio, distances are measured by determining the relative phases of outgoing and incoming signals which are received after reflection or transmission from an object whose distance is to be determined. In such systems where the distance is proportional to the phase change, it is highly desirable to provide phase means which are independent of ambient changes in temperature. If the systems are not independent of temperature changes unwanted phase shifts may occur. These phase shifts correspond to changes in distance and thus are a source of error.

In some systems for radio navigation or measurement of distances, it is desirable to provide two independent channels for determining the radio propagation times or distances from a pair of base stations. The present invention lends itself especially to such systems in that it provides a simple and reliable means for shifting the phase of timing potentials which are applied to two channels. An example of such a distance determining or navigating system is found in the copending application Serial No. 381,020, filed February 28, 1941, by Stuart W. Seeley, for Position determining system, now Patent No. 2,405,239, issued August 6, 1946, which is assigned to the same assignee as the instant application.

One of the objects of the present invention is to provide an improved electrical network for obtaining quadrature phase currents from a single phase source. Another object is to provide an improved electrical network for shifting phases which is substantially unaffected by ambient temperature changes. Another object is to provide an improved electrical network in which a single phase may be converted into a polyphase and in which the output impedances have substantially no effect on the voltage of the single phase source. An additional object is to provide an improved electrical network in which quadrature phase currents may be applied to a pair of goniometers having independent output circuits. A still further object is to provide a plurality of electrical networks and phase shifters in which several voltages of different frequencies may be simultaneously shifted through predetermined phase angles.

The invention will be described by referring to the accompanying drawing in which Figure 1 is a schematic diagram of one embodiment of the invention and Figure 2 is a schematic diagram of a dual channel phase shifter having a plurality of electrical networks in accordance with the invention.

Referring to Figure 1, two resistive elements 1, 3 and two reactive elements 5, 7 are connected to form a Wheatstone bridge. The resistive elements 1, 3 are in opposite arms of the bridge as are the reactive elements 5, 7. A second Wheatstone bridge is formed with similar resistive arms 9, 11 and similar reactive arms 13, 17. As in the case of the first bridge, the resistive arms 9, 11 are opposed as are the reactive arms 13, 17 and the four reactive elements are of similar sign. The two bridges are connected in series by forming a common connection 19 at the junction of the arms 3, 7 of the first bridge and the junction of the arms 9, 13 of the second bridge. The input terminals 21, 23 of the two bridges are connected to the single phase source represented as an alternating current generator 25.

The first output terminals 27, 29 of the network are formed by the junction of arms 1 and 7 and by the junction of the arms 3 and 5 of the first bridge. The other pair of output terminals 31, 33 are formed by the junction of the arms 9 and 17 and by the junction of the arms 11 and 13 of the second bridge. These four terminals 27, 29, 31, 33 become the source of quadrature phase currents which may be applied for any desided purpose. By way of example, two of the field coils 35, 37 of a goniometer 39 may be connected across the terminals 27—31 and 27—29, respectively. The field coils 41—43 of a second goniometer 45 may be connected across the terminals 29—33 and 33—31, respectively. The rotor of the first goniometer is represented as a pick-up coil 47 while the rotor of the second goniometer is represented as a pick-up coil 49. The pick-up coils each represent sources of voltage having a phase which may be adjusted through any desired angular shift up to 360 degrees per complete rotation of the pick-up coil.

To provide the best results the impedance of all arms of the two bridges should be made numerically equal. By way of example, if the single phase source has a frequency at 93 kilocycles, the several resistive elements 1, 3, 9 and 11 may be 855 ohms while the several reactive elements 5, 7, 13 and 17 may have capacities of 2000 micromicrofarads. These capacities at 93 kilocycles have a reactance of approximately 855 ohms. If the two bridges are thus arranged, it can be shown mathematically that the currents in the several output connections 27—29, 29—33, 33—31 and 31—27 will be in quadrature with each other and will continue to be in quadrature substantially independent of the resistances or impedances connected across the output terminals provided only that those resistances or impedances remain equal to each other.

If the network is connected to pairs of goniometers whose inductive reactance is numerically equal to the impedance of the other arms as shown in Figure 1, the phase of the goniometer primary currents will be completely independent of ambient temperature changes. This is an important feature of the network in view of the fact that the goniometer field coils are usually wound of copper wire which has resistance as indicated by the elements R. Since an ordinary goniometer connection to a conventional phase shifter would be influenced by the effect of temperature changes in the goniometer coil, it follows that the symmetrical arrangement of the present network offers great advantages. Likewise, if the inductance of each of the windings is made equal in ohms to each of the eight arms of the electrical bridge network, the phases of the currents through the goniometer field coils or stators 37, etc., maintain fixed relations to the phase of the driving voltage from the single phase source 25 in the presence of wide variations of ambient temperature.

Since the phase angle of the impedances through which these currents flow will vary with temperature, the phases of the voltages across the field coils will vary. This, of course, has no effect on the phase of the output voltage across the rotor. If, for any reason, it is also desirable to have the field voltages remain in a fixed phase relation to the supply voltage, resistors with a negative temperature coefficient to compensate resistance changes of the primary windings may be included in series with those windings. However, tests show no measurable phase shift of secondary voltage (less than 1 degree) even without compensation between —70 degrees F. and +154 degrees F. ambient.

While the network of Figure 1 has been used to illustrate the electrical network which may be associated with a pair of goniometers 39, 45 for shifting the phase in a pair of channels, it should be understood that the invention may be used to shift the phase of currents of different frequencies through predetermined ranges in accordance with the invention disclosed and claimed in copending application Serial No. 547,255, filed July 29, 1944, in the name of Stuart W. Seeley and entitled Phase shifters.

Figure 2 is a schematic diagram illustrating the application of the invention to a plurality of phase shifters which provide for dual channel operation. By way of example, an oscillator 51 provides a single phase source of frequency F. This single phase source is connected to the first bridge and goniometer 53 which corresponds to the arrangement described in detail in connection with Figure 1. The oscillator 51 is also connected to a frequency divider 55 in which the fundamental frequency F is divided by ten. The currents from the frequency divider 55 are applied to a second electrical bridge and goniometer network 57. The output of the frequency divider 55 is applied to a second frequency divider 59. The second frequency divider is a means for dividing the applied frequency ten to one so that the initial frequency F becomes equal to F/100. The output of the second frequency divider is applied to a third electrical bridge and goniometer 61. The outputs of the goniometers 63, 65, 67 may be applied to any desired utilization circuit (not shown). The rotor coils of the several goniometers may be connected to a unitary control represented by the dash lines 69. A second set of goniometers 71, 73, 75 may be connected to a unitary control 77. The respective sets of goniometers represent dual channels.

Thus the invention has been described as an improved electrical network for obtaining quadrature phase currents or potentials from a single phase source. The quadrature phase currents may be applied to pairs of goniometers. The goniometers offer a convenient means for shifting continuously the phase of the potentials from the single phase source. Regardless of the kind or magnitude of impedances connected between points 27, 29—29, 33—33, 31 and 31, 37 (as long as they are all identical) the impedance of the whole circuit between points 21, 23 is the same. Thus the load presented to the driving source remains fixed with changes in the primary impedances 27, 29—29, 33 etc. The network is unique in its simplicity and freedom from ambient temperature changes.

The invention covered herein may be manufactured and used by or for the Government of the United States for any governmental purpose without payment to me or assigns of any royalty thereon.

I claim as my invention:

1. An electrical network for converting a single phase current to a quadrature phase current consisting of four resistive elements and four reactive elements of similar sign, said elements being connected in a symmetrical arrangement to form two Wheatstone bridges in which the reactive elements are in opposite arms, a series connection between said Wheatstone bridges whereby said single phase current may be applied to the input arms of said bridges in series, and four terminals connected to the output arms of said bridges for deriving therefrom said quadrature phase currents.

2. An electrical network for converting a single phase current to a quadrature phase current consisting of four resistive elements and four reactive elements of similar sign, said elements offering the same impedance to said single phase current and being connected in a symmetrical arrangement to form two Wheatstone bridges in which the reactive elements are in opposite arms of the respective Wheatstone bridges, a series connection between said Wheatstone bridges whereby said single phase current may be applied to the input arms of said bridges in series, and four terminals connected to the output arms of said bridges for deriving therefrom said quadrature phase currents.

3. An electrical network for deriving quadrature phase potentials from a single phase source including a pair of electrical bridges each consisting of two resistive arms and two reactive arms connected so that the reactive arms are opposite to each other, a series connection between said two bridges, input terminals for said single phase source connected respectively to said bridges so that viewed from one input terminal said electrical bridges are symmetrical, and four output terminals connected to the conjugate output arms of said electrical bridges and providing said sources of quadrature phase potentials.

4. An electrical network for deriving quadrature phase potentials from a single phase source including a pair of electrical bridges each consisting of two resistive arms and two reactive arms connected so that the reactive arms are opposite to each other, said arms having equal impedances at the operating frequency, a series connection between said two bridges, input terminals for said single phase source connected respectively to said bridges so that viewed from one input terminal said electrical bridges are symmetrical, and four output terminals connected to the conjugate output arms of said electrical bridges and providing said source of quadrature phase potentials.

5. An electrical network for shifting phases including a pair of electrical bridges each consisting of two resistive arms and two reactive arms connected so that the reactive arms are opposite to each other, a series connection between said two bridges, input terminals for said single phase source connected respectively to said bridges so that viewed from one input terminal said electrical bridges are symmetrical, four output terminals connected to the conjugate output arms of said electrical bridges and providing said sources of quadrature phase potentials, and a pair of goniometers each having a rotor winding and a pair of stator windings, said stator windings of one goniometer being connected to three of said output terminals and said stator windings of the other goniometer being connected across three of said output terminals whereby quadrature phase currents are applied to said goniometer stators and variable phase voltages are obtained independently from said rotor windings.

6. An electrical network for shifting phases including a pair of electrical bridges each consisting of two resistive arms and two reactive arms connected so that the reactive arms are opposite to each other, said arms having numerically equal impedances at the operating frequency, a series connection between said two bridges, input terminals for said single phase source connected respectively to said bridges so that viewed from one input terminal said electrical bridges are symmetrical, four output terminals connected to the conjugate output arms of said electrical bridges and providing said sources of quadrature phase potentials, and a pair of goniometers each having a rotor winding and a pair of stator windings, each of the stator windings of said pairs having a reactive impedance numerically equal to said arms at the operating frequencies, said stator windings of one goniometer being connected to three of said output terminals and said stator windings of the other goniometer being connected across three of said output terminals whereby quadrature phase currents are applied to said goniometer stators and variable phase voltages are obtained independently from said rotor windings.

7. An electrical network for converting a single phase current to a quadrature phase current consisting of four resistive elements and four reactive elements of similar sign, said elements being connected in a symmetrical arrangement to form two Wheatstone bridges in which the reactive elements are in opposite arms, means for applying said single phase current to the input arms of said bridges, and four terminals connected to the output arms of said bridges for deriving therefrom said quadrature phase currents.

8. An electrical network for converting a single phase current to a quadrature phase current consisting of four resistive elements and four reactive elements of similar sign, said elements having substantially the same impedance to said single phase current at the operating frequency and being connected in a symmetrical arrangement to form two Wheatstone bridges in which the reactive elements are in opposite arms of the respective Wheatstone bridges, means for applying said single phase current to the input arms of said bridges, and four terminals connected to the output arms of said bridges for deriving therefrom said quadrature phase currents.

STUART W. SEELEY.

REFERENCES CITED

The following references are of record in the file of this patent:

UNITED STATES PATENTS

| Number | Name | Date |
| --- | --- | --- |
| 1,946,274 | Chireix | Feb. 6, 1934 |
| 2,256,538 | Alford | Sept. 23, 1941 |